(12) United States Patent
Kanda et al.

(10) Patent No.: US 7,783,180 B2
(45) Date of Patent: Aug. 24, 2010

(54) IMAGING APPARATUS WITH A FUNCTION OF COMPENSATING FOR HAND SHAKE, METHOD OF COMPENSATING FOR HAND SHAKE, AND COMPUTER PROGRAM PRODUCT

(75) Inventors: Kazuhiko Kanda, Hino (JP); Kazunori Shimada, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 374 days.

(21) Appl. No.: 11/975,874

(22) Filed: Oct. 22, 2007

(65) Prior Publication Data
US 2008/0101783 A1 May 1, 2008

(30) Foreign Application Priority Data
Oct. 26, 2006 (JP) .............................. 2006-291455

(51) Int. Cl.
G03B 17/00 (2006.01)
H04N 5/228 (2006.01)

(52) U.S. Cl. ..................................... 396/55; 348/208.99
(58) Field of Classification Search .................. 396/52, 396/55; 348/208.99, 208.4, 208.7, 208.11, 348/208.12
See application file for complete search history.

(56) References Cited

U.S. PATENT DOCUMENTS

| 2002/0080242 | A1* | 6/2002 | Takahashi et al. | 348/208 |
| 2005/0140793 | A1* | 6/2005 | Kojima et al. | 348/208.99 |
| 2007/0122133 | A1* | 5/2007 | Shiratori | 396/55 |

FOREIGN PATENT DOCUMENTS

| JP | 11-015035 A | 1/1999 |
| JP | 11-072814 A | 3/1999 |
| JP | 11-101998 A | 4/1999 |
| JP | 2002-107787 A | 4/2002 |
| JP | 2006-33462 A | 2/2006 |
| JP | 2006-113468 A | 4/2006 |

OTHER PUBLICATIONS

English translation of JP-11072814, Maeda Toshiaki, Japan, Mar. 16, 1999.*
Korean Office Action dated Dec. 1, 2008 (3 pages), and English translation thereof (3 pages) isued in counterpart Korean Application No. 10-2007-0107715.
Chinese Office Action dated Jun. 12, 2009 and English translation thereof issued in a counterpart Chinese Application No. 2007103003800.
Japanese Office Action (and English translation thereof) dated May 27, 2008, issued in a counterpart Japanese Application.

* cited by examiner

*Primary Examiner*—Rodney E Fuller
(74) *Attorney, Agent, or Firm*—Frishauf, Holtz, Goodman & Chick, P.C.

(57) ABSTRACT

In an imaging apparatus, an imaging element picks up an object image focused thereon through an image pickup lens. An angle-rate sensor detects a shake amount of the imaging apparatus. An optical shake-compensation unit is prepared to move the image pickup lens based on the shake amount detected by the angle-rate sensor to compensate for a shake of the object image. A base plate shake-compensation unit is prepared to move the imaging element based on the shake amount detected by the angle-rate sensor to compensate for a shake of the object image and a control unit selectively controls operation of the optical shake-compensation unit and operation of the base plate shake-compensation unit, thereby compensating for a shake of the object image focused on the imaging element.

5 Claims, 7 Drawing Sheets

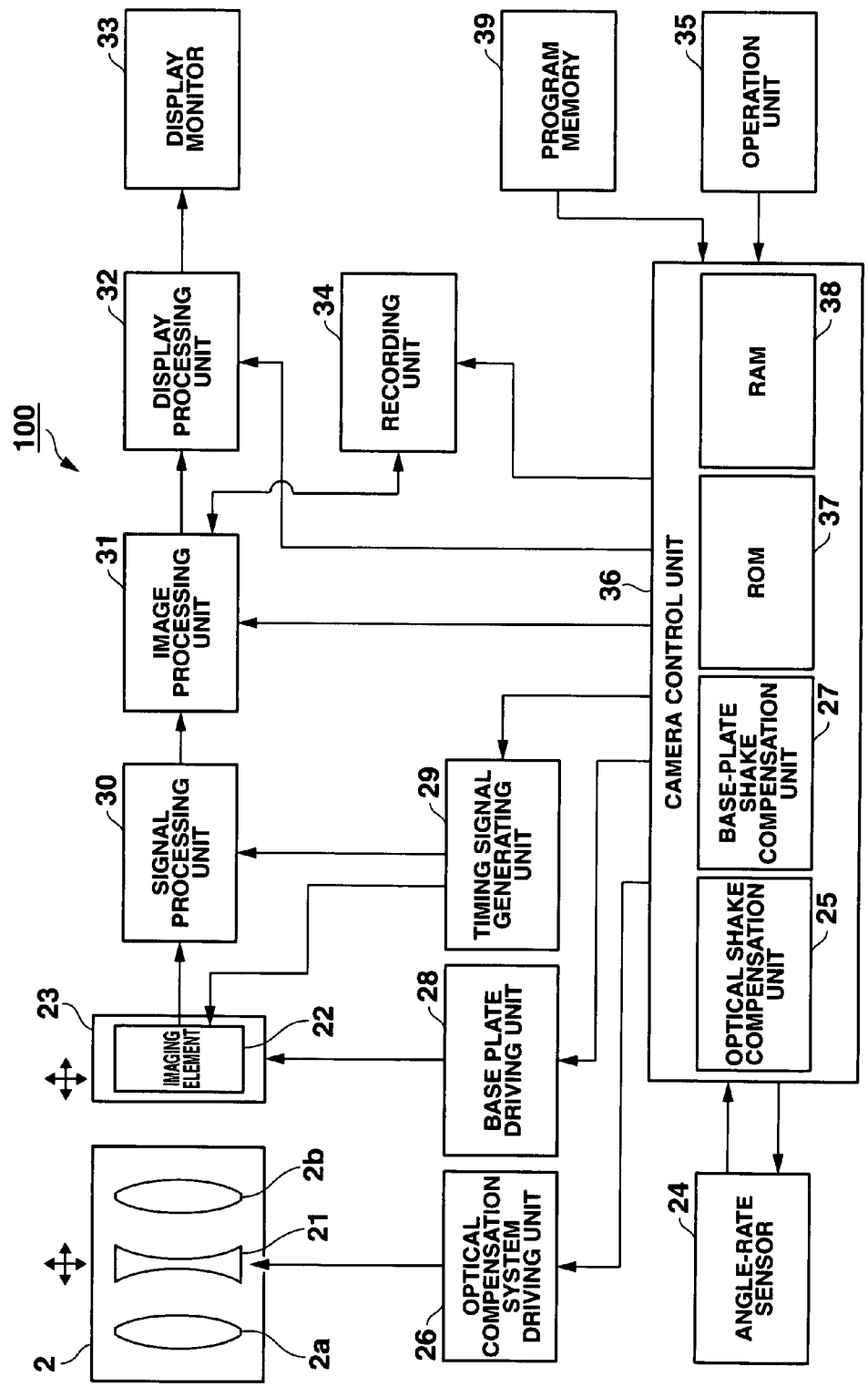

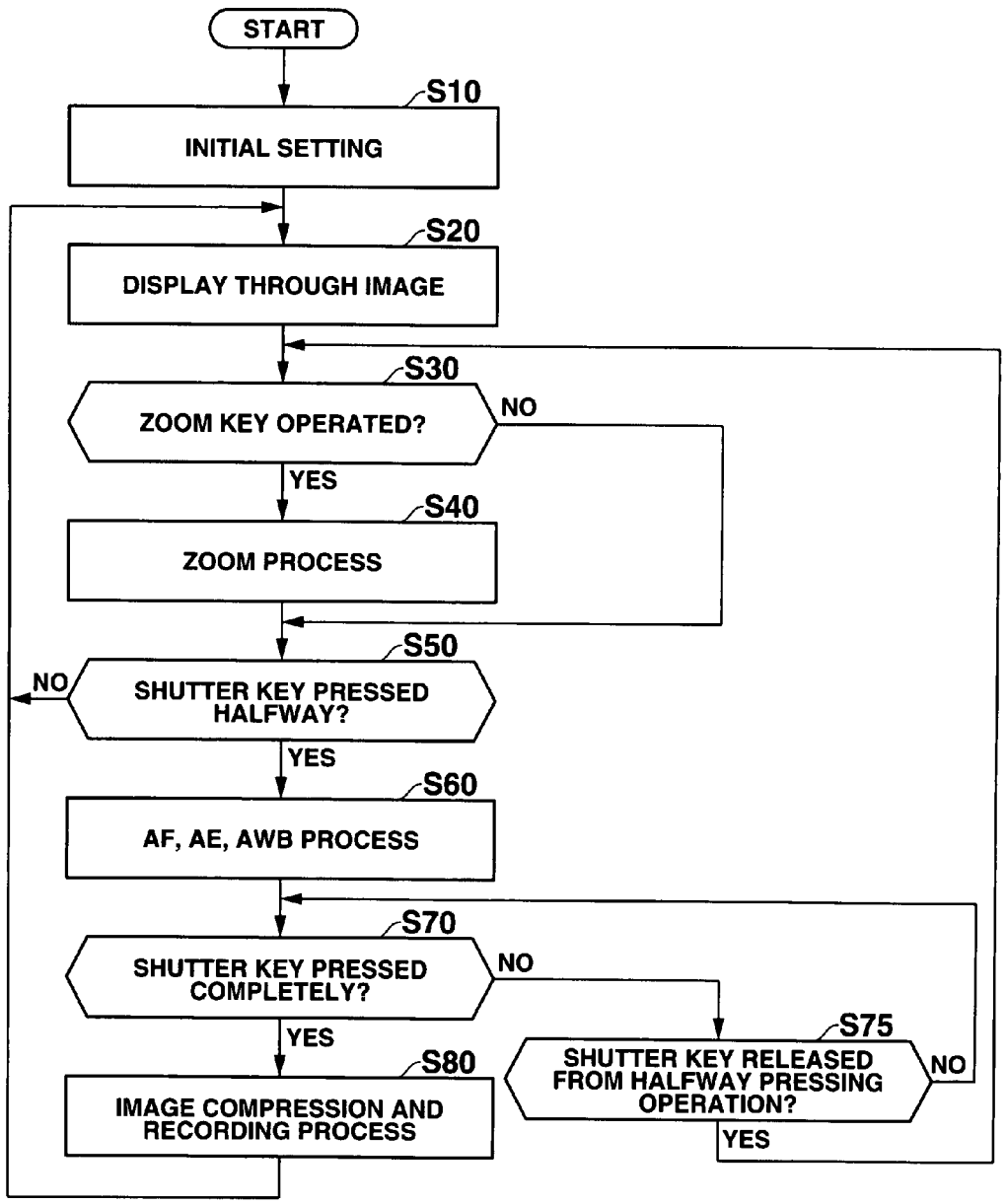

FIG.5

| MODE | ZOOM FACTOR | SHUTTER | SHAKE COMPENSATION |
|---|---|---|---|
| M1 | LOW | | OPTICAL SYSTEM |
| M1 | HIGH | | IMAGING ELEMENT |
| M2 | | | OPTICAL SYSTEM + IMAGING ELEMENT |
| M3 | | HALFWAY | OPTICAL SYSTEM |
| M3 | | FULL-WAY | OPTICAL SYSTEM + IMAGING ELEMENT |

IMAGING APPARATUS WITH A FUNCTION OF COMPENSATING FOR HAND SHAKE, METHOD OF COMPENSATING FOR HAND SHAKE, AND COMPUTER PROGRAM PRODUCT

CROSS-REFERENCE TO RELATED APPLICATIONS

This application is based on and claims the benefit of priority from the prior Japanese Patent Application No. 2006-291455, filed on Oct. 26, 2006, and including specification, claims, drawings and summary, the entire contents of which are incorporated herein by reference.

BACKGROUND OF THE INVENTION

1. Field of the Invention

The present invention relates to an electronic camera with a function of compensating for hand shake, a method of compensating for hand shake in an electronic camera, and a computer program product.

2. Description of the Related Art

As hand-shake compensating techniques in conventional electronic cameras are known optical compensation techniques such as a compensation-lens shifting system as disclosed in Japanese Patent Application No. 2006-33462 A and a variable apex-angle prism system. In the compensation-lens shifting system, a special lens for compensating for hand shake is provided in an optical image pickup system and the special lens is moved by an actuator so as to cancel hand shake. In the variable apex-angle prism system, a variable apex-angle prism filled with liquid of high refraction index is used and an apex of the prism is moved by actuator so as to change a light pass to cancel hand shake.

Meanwhile, as an image-sensor shifting system for compensating for hand shake is known a mechanical compensation technique, in which an image sensor is moved by an actuator to cancel hand shake. Further, as an image clipping system for suppressing effects of hand shake in a moving picture is known an electronic compensation technique, in which images are read at predetermined rate, and the same image areas are clipped from the respective images in accordance with image shake appearing between images, and the clipped images are used to compensate for hand shake.

As an image-shake locus restoration system is known an image compensation processing technique which performs a restoration calculating process using locus information on image shake of shot images to remove effects of hand shake.

Conventional electronic cameras use one of these compensation techniques. In particular, the compensation-lens shifting system and the image-sensor shifting system are widely employed in the camera industry.

Since the compensation-lens shifting system moves its optical system, this system has a disadvantage that lens aberration deteriorates image quality. In particular, when lens of a high multiplication factor is used, image quality is deteriorated significantly.

The image-sensor shifting system uses a light receiving element. This light receiving element is large in size compared with the compensation lens of the compensation-lens shifting system. Therefore, more power is consumed in the image-sensor shifting system to compensate for image shake of the same level.

SUMMARY OF THE INVENTION

The present invention has been made to solve problems involved in the conventional techniques described above, and has an object to provide an imaging apparatus with a function of compensating for hand shake, a method of compensating for hand shake, and a computer program product, which can appropriately compensate for hand shake with less power consumption.

According to one aspect of the invention, there is provided an imaging apparatus which comprises an image pickup lens for shooting an object, an imaging element having an imaging area for picking up an object image focused on the imaging area through the image pickup lens to output an image signal, a shake detecting unit for detecting a shake amount of the imaging apparatus, a first shake compensation unit for moving the image pickup lens in a predetermined direction based on the shake amount detected by the shake detecting unit to compensate for shake of an object image focused on the imaging area of the imaging element, a second shake compensation unit for moving the imaging element in a predetermined direction based on the shake amount detected by the shake detecting unit to compensate for shake of the object image focused on the imaging area of the imaging element, and a control unit for selectively controlling operation of the first shake compensation unit to compensate for shake of the object image and operation of the second shake compensation unit to compensate for shake of the object image.

According to other aspect of the invention, there is provided a method of compensating for shake of an imaging apparatus having an image pickup lens for shooting an object and an imaging element including an imaging area for picking up an object image focused on the imaging area through the image pickup lens to output an image signal, which method comprises a step of detecting a shake amount of the imaging apparatus, a step of moving the image pickup lens in a predetermined direction based on the detected shake amount to compensate for shake of an object image focused on the imaging area of the imaging element, a step of moving the imaging element in a predetermined direction based on the detected shake amount to compensate for shake of the object image focused on the imaging area of the imaging element, and a step of selectively controlling movement of the image pickup lens to compensate for shake of the object image and movement of the imaging element to compensate for shake of the object image.

According to still other aspect of the invention, there is provided a computer program product stored on a computer readable medium for controlling operation of a computer, the computer readable medium mounted on an imaging apparatus having an image pickup lens for shooting an object and an imaging element including an imaging area for picking up an object image focused on the imaging area through the image pickup lens to output an image signal, the computer program product for making the computer implement operation for compensating for shake of the imaging apparatus, wherein the compensating operation comprises a process of detecting a shake amount of the imaging apparatus, a process of moving the image pickup lens in a predetermined direction based on the detected shake amount to compensate for shake of an object image focused on the imaging area of the imaging element, a process of moving the imaging element in a predetermined direction based on the detected shake amount to compensate for shake of the object image focused on the imaging area of the imaging element, and a process of selectively controlling movement of the image pickup lens to compensate for shake of the object image and movement of the imaging element to compensate for shake of the object image.

The imaging apparatus according to the present invention can appropriately compensate for hand shake with less power consumption.

BRIEF DESCRIPTION OF THE DRAWINGS

These objects and other objects and advantages of the present invention will become more apparent upon reading of the following detailed description and the accompanying drawings, in which FIG. 2 is a block diagram showing configuration of the electronic camera shown in FIGS. 1A and 1B, FIG. 3 is a flow chart of general operation of the electronic camera with a function of compensating for hand shake according to the present invention, FIG. 5 is a table of compensations for hand shake performed in respective modes of the electronic camera according to the first embodiment of the invention.

DETAILED DESCRIPTION OF THE PREFERRED EMBODIMENTS

Now, embodiments of the present invention will be described in detail with reference to the accompanying drawings. An imaging apparatus of the present invention is used in electronic cameras, cellular phones with a photographing function, PHS (Personal Handy-phone System), PDA (Personal Data Assistance), and the like. Hereinafter, the imaging apparatus of the invention will be described, which is employed in an electronic camera.

First Embodiment

Figure 1A:
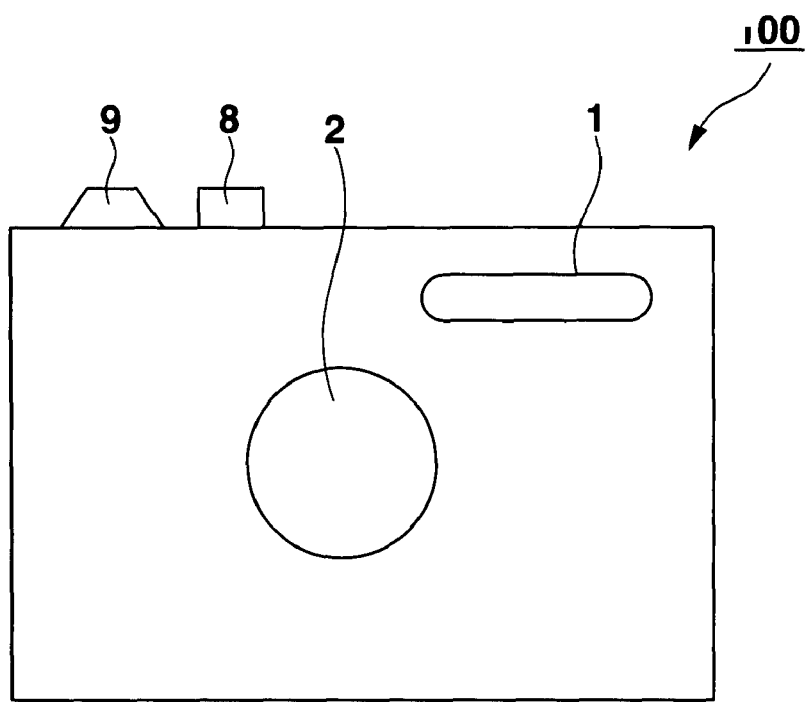
FIG. 1A is a front view illustrating an external appearance of an electronic camera according to the first embodiment of the present invention.
Figure 1B:
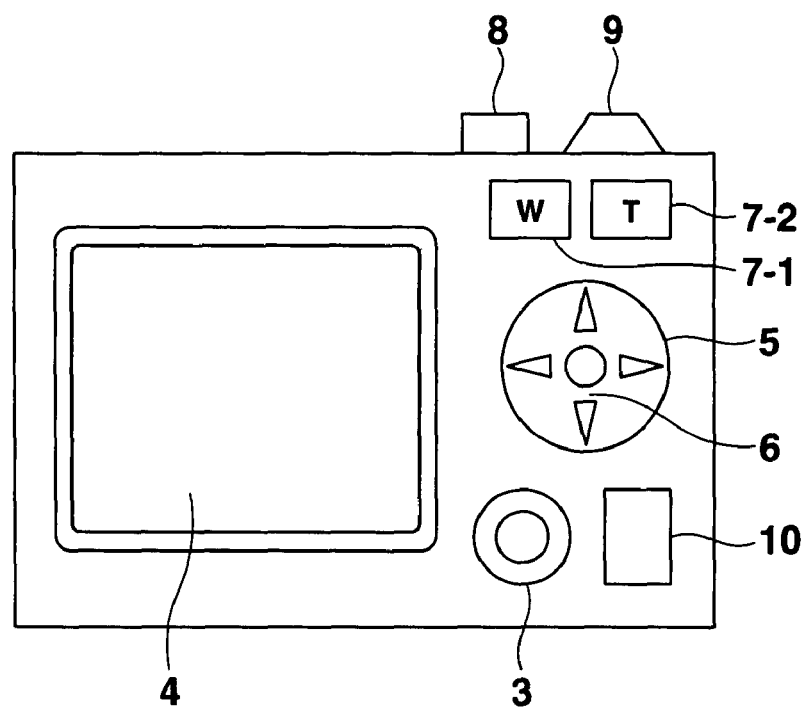
FIG. 1B is a rear view illustrating an external appearance of the electronic camera according to the first embodiment of the present invention.

Now, an external view of an electronic camera 100 according to the first embodiment of the invention will be described. FIG. 1A and FIG. 1B are a front view and rear view of the electronic camera 100, respectively. The electronic camera 100 is provided with a flash unit 1 and image pick-up lens (lenses) 2 on its front surface, as shown in FIG. 1A. Further, on the rear surface of the electronic camera 100 are provided a mode dial 3, liquid crystal display screen 4, cursor key 5, SET key 6, zoom key (W-button 7-1, T-button 7-2), and a hand-shake compensation function key 10, as shown in FIG. 1B. On the top of the electronic camera 100 are provided a shutter key 8 and power source button 9, and on its side is provided USB terminal (not shown), which is used for connecting the electronic camera 100 with an external apparatus such as a personal computer and modem through USB cable.

A configuration of the electronic camera 100 of the external view illustrated above will be described.

FIG. 2 is a block diagram of the electronic camera 106 shown in FIGS. 1A and 1B.

The image pick-up lens (lenses) 2 comprises a zoom lens 2a, focus lens 2b, and an optical compensation system 21. The zoom lens 2a is moved forward and/or backward along its optical axis by a zoom control mechanism (not shown). The field angle or coverage angle of the image pick-up lens 2 changes as the zoom lens 2a moves forward and/or backward. The focus lens 2b is moved forward and/or backward along its optical axis by a focus control mechanism (not shown). The focus of the focus lens 2b is adjusted by moving the focus lens forward or backward. The optical compensation system 21 is moved in a direction perpendicular to the optical axis of the image pick-up lens 2 by an actuator provided in an optical compensation system driving unit 26. The driven optical compensation system 21 shifts an object image focused on an imaging area of an imaging element 22.

The imaging element 22 consists of CCD or the like. The imaging element 22 generates a shooting signal corresponding to an object image focused on its imaging area.

A signal processing unit 30 converts an analog shooting signal into a digital signal, and executes on the digital signal predetermined processes such as a color interpolating process, gamma correcting process, white balancing process, and a shading correcting process.

A timing signal generating unit 29 generates a timing signal for reading the shooting signal from the imaging element 22.

An angle-rate sensor 24 directly detects physical movements of the electronic camera 100, and outputs to a camera control unit 36 a movement-detection signal representing an angle rate.

An optical shake-compensation unit 25 is provided in the camera control unit 36, and has a conversion table for calculating a compensation amount corresponding to a level of the movement-detection signal sent from the angle-rate sensor 24. Upon receipt of instructions for starting compensation sent from the camera control unit 36, the optical shake-compensation unit 25 is activated and calculates a first compensation amount based on the movement-detection signal generated by the angle-rate sensor 24, and makes the optical compensation system driving unit 26 drive the optical compensation system 21.

The optical compensation system driving unit 26 drives the optical compensation system 21 in a direction perpendicular to the optical axis of the image pick-up lens 2 in accordance with the compensation amount sent from the camera control unit 36. The optical compensation system 21 is driven by an amount determined by the optical shake-compensation unit 25.

A base-plate shake compensation unit 27 is provided in the camera control unit 36, and has a conversion table for calculating a compensation amount corresponding to a level of the movement-detection signal sent from the angle-rate sensor 24. Upon receipt of instructions for starting compensation sent from the camera control unit 36, the base-plate shake compensation unit 27 is activated and calculates a compensation amount based on the movement-detection signal generated by the angle-rate sensor 24, and makes a base-plate driving unit 28 drive a base plate 23.

Driven by an actuator provided on the base-plate driving unit 28, the base plate 23 moves its mechanical position in a direction perpendicular to the optical axis of the image pick-up lens 2 so as to cancel hand shake. The driven base plate 23 shifts the imaging area of the imaging element 22.

An image processing unit 31 serves to convert image data supplied from a signal processing unit 30 into a predetermined data format and to supply the image data to a display processing unit 32. The display processing unit 32 generates a video signal based on the image data and sends the video signal to a display monitor 33.

The display monitor 33 comprises a liquid crystal display panel and the like, and displays an image based on the video signal sent from the display processing unit 32. The images to be displayed on the display monitor 33 includes through images successively generated by the imaging element 22 before a still image is photographed, a still image generated by the imaging element 22 after instructions have been given for shooting a still image, a video image during shooting a video image, and a reproduced image based on the image data recorded on a recording unit 34. Display angles of these images can be electrically changed on the display monitor 33 by operating an operation unit 35 (electronic zoom).

The recording unit 34 comprises a detachable memory card and the like. In a shooting mode, image data which has been converted into a predetermined format by the image processing unit 31 is recorded on the recording unit 34. In a reproducing mode, the image data is read from the recording unit 34 and sent to the image processing unit 31. The image processing unit 31 generates a video signal to display a reproduced image on the display monitor 33. The electronic camera 100 has a still-image shooting mode and a movie shooting mode, which are alternatively selected by a user. In the movie mode, audio data can be recorded as will be described later.

The operation unit 35 includes a power switch, zoom switch, mode setting dial, and a release switch (halfway press switch, full-way press switch). When operated, these switches generate operation signals respectively, and send the operation signals to a camera control unit 36.

The camera control unit 36 comprises CPU, ROM 37 which stores initial values and shooting conditions to be read by CPU, and RAM 38 for storing calculation results. In response to operation signals supplied from the operation unit 35, the camera control unit 36 outputs instructions to various blocks in the electronic camera 100 to control operation of the electronic camera 100. ROM 37 has a zoom table which stores zoom rates corresponding to zoom positions (zoom stages).

A program memory 39 comprises a storage device such as a flash memory, and stores program which CPU of the camera control unit 36 runs.

Now, operation of the electronic camera 100 having the configuration illustrated above will be described.

FIG. 3 is a flow chart of operation to be performed by the electronic camera 100 of the present invention. CPU of the camera control unit 36 runs the program stored on the program memory 39, thereby executing processes set forth below. The processes to be executed by CPU will be described in accordance with the flow chart shown in FIG. 3. The description is made on the assumption that the electronic camera 100 has a zoom function and an auto-focus function.

First, it is assumed that a user operates the power source button 9 to start the electronic camera 100, and further operates the mode dial 3 shown in FIG. 1B to select either one of moods M1, M2 and M3. Then, the camera control unit 36 reads from ROM 37 initial values and initial shooting conditions corresponding to the selected mode, and sets them on RAM 38 at step S10 in FIG. 3.

Then, the camera control unit 36 displays a through image on the display monitor 33 at step S20. More specifically, the camera control unit 36 supplies to the timing signal generating unit 29 a start signal to start a through-image displaying process. Upon receipt of the start signal, the timing signal generating unit 29 sends a timing signal to the imaging element 22 and signal processing unit 30. The imaging element 22 generates an image signal and outputs the image signal to the signal processing unit 30. The signal processing unit 30 produces image data from the received image signal and outputs the image data to an image processing unit 31. The image processing unit 31 converts a format of the image data to a predetermined format, and outputs the image data of the predetermined format to a display processing unit 32. The display processing unit 32 executes a display process on the received image data to display a through image on the display monitor 33.

Further, the camera control unit 36 judges at step S30 whether or not zoom instructions have been issued in response to a signal from the operation unit 35. In other words, the camera control unit 36 judges at step S30 whether either W-button 7-1 or T-button 7-2 has been operated.

When it is determined at step S30 that the zoom instructions have been issued (YES at step S30), the camera control unit 36 controls the image pick-up lens 2 to execute a zoom process at step S40. More specifically, the camera control unit 36 sends a control signal to a zoom-lens driving unit (not shown) to drive a zoom motor (not shown), thereby moving the image pick-up lend to a zoom position corresponding to a designated zoom stage. The camera control unit 36 stores the current zoom position (zoom-stage number) of the image pick-up lens 2 on RAM 38.

Meanwhile, when it is determined at step S30 that no zoom instructions have been issued (NO at step S30), the camera control unit 36 advances to step S50.

The camera control unit 36 judges at step S50 whether or, not a halfway-pressing operation of the shutter key 8 has started in accordance with the signal from the operation unit 35.

When it is determined at step S50 that the user has started pressing the shutter key 8 halfway (YES at step S50), the camera control unit 36 executes an auto-focus process (AF process) with a focusing distance corresponding to the zoom position (zoom-stage number) selected at that time, auto-iris process (AE process), and a white balancing process (AWB process) at step S60. Further, the camera control unit 36 applies the results of the processes executed at step S60 to various units of the electronic camera 100. Again, image data is produced by the imaging element 22 and the signal processing unit 30, and the image data is processed by the image processing unit 31 and display processing unit 32, whereby a through image is displayed on the display monitor 33.

Meanwhile, when it is determined at step S50 that the user has not started pressing the shutter key 8 halfway (NO at step S50), then the camera control unit 36 returns to the process at step S20.

The camera control unit 36 judges at step S70 whether or not the shutter key 8 has been pressed completely.

When it is determined at step S70 that the shutter key 8 has been pressed completely (YES at step S70), the camera control unit 36 obtains from the imaging element 22 an image signal which is used to generate another still image at step S80. More specifically, the camera control unit 36 supplies a start signal for starting a still-image producing process to the timing signal generating unit 29. Upon receipt of the start signal from the camera control unit 36, the timing signal generating unit 29 outputs a timing signal to the imaging element 22 and signal processing unit 30. The imaging element 22 generates an image signal of a high resolution, and supplies the generated image signal to the signal processing unit 30. Then, the signal processing unit 30 generates image data based on the image signal, and supplies the image data to the image processing unit 31. The image processing unit 31 implements JPEG Compression on one frame of image data (still image data), and records the compressed still image data on a recording unit 34 of SD card, thereby executing shooting process for one frame of still image. Then, the camera control unit 36 returns to the process at step S20.

Meanwhile, when it is determined at step S70 that the shutter key 8 has not been pressed completely (NO at step S70), the camera control unit 36 judges based on a signal sent from the operation unit 35 at step S75 whether or not the shutter key 8 has been released from halfway pressing operation. When it is determined at step S75 that the shutter key 8 has been released from halfway pressing operation (YES at step S75), the camera control unit 36 returns to the process at step S30. When it is determined at step S75 that the shutter key 8 has not been released from halfway pressing operation (NO at step S75), the camera control unit 36 returns to the process at step S70.

Figure 4:
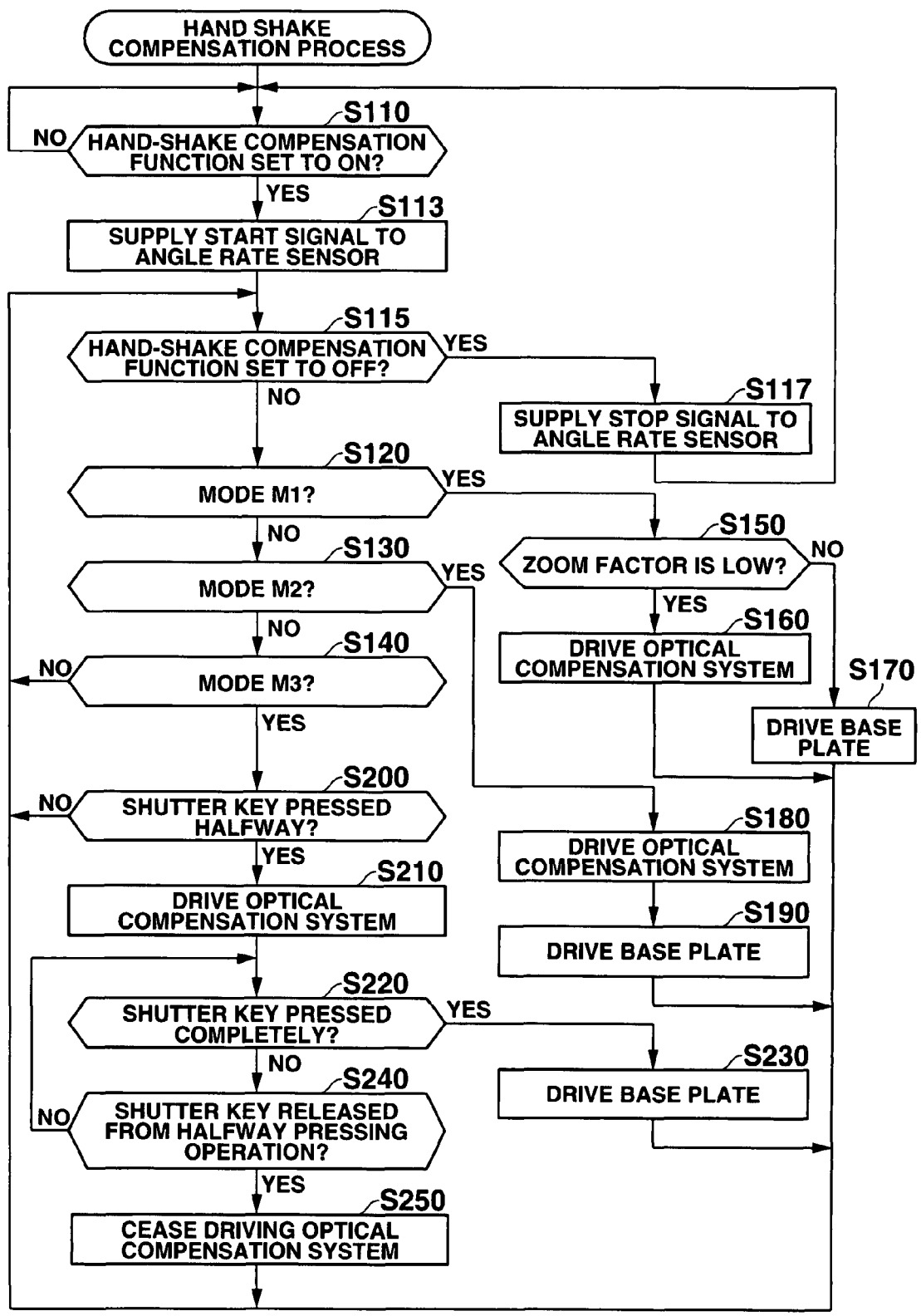
FIG. 4 is a flow chart of a "hand-shake compensation process" performed in the first embodiment of the invention.

FIG. 4 is a flow chart of a "hand shake compensation process" performed in the electronic camera 100 according to the first embodiment of the present invention. The "hand shake compensation process" (FIG. 4) and the operation of the camera 100 (FIG. 3) are performed in parallel.

When the user operates a hand-shake compensation function key 10, an ON/OFF operation signal is input to the operation unit 35 in response to user's operation. At this time, the operation unit 35 generates and outputs an interrupt signal to the camera control unit 36, and the camera control unit 36 sets a flag indicating contents of operation at an ON/OFF setting flag area of RAM 38.

The camera control unit 36 searches through the ON/OFF setting flag area of RAM 38 set by the operation unit 35 at step S110 in FIG. 4 to judge whether or not a hand-shake compensation function has been set to ON.

When it is determined at step S110 that the hand-shake compensation function has been set to ON (YES at step S110), the camera control unit 36 supplies a start signal to an angle-rate sensor 24 at step S113 to make the same sensor start detecting a shake amount of the electronic camera 100.

The angle-rate sensor 24 generates a detection signal indicating the detected shake amount of the electronic camera 100 and supplies the generated detection signal to the camera control unit 36 or to an optical shake-compensation unit 25 and a base-plate shake compensation unit 27 provided on the camera control unit 36.

Then, the camera control unit 36 searches through the ON/OFF setting flag area of RAM 38 set by the operation unit 35 at step S115 to judge whether the hand-shake compensation function has been set to OFF or not.

When it is determined at step S115 that the hand-shake compensation function has been set to OFF (YES at step S115), the camera control unit 36 supplies a stop signal to the angle-rate sensor 24 at step S117 to make the same sensor cease detecting a camera shake amount of the electronic camera 100. Then, the camera control unit 36 returns to the process at step S110. In the case where the optical compensation system 21 or the base plate 23 is being driven at the time when the hand-shake compensation function is set to OFF, driving operation of the optical compensation system 21 and/or the base plate 23 is shut down.

Meanwhile, when it is determined at step S115 that the hand-shake compensation function has not been set to OFF (NO at step S115), that is, when the hand-shake compensation function is kept ON, the camera control unit 36 reads contents set by mode dial 3 at step S120 to judge whether the mode M1 has been set or not.

When it is determined at step S120 that the mode M1 has been set (YES at step S120), the camera control unit 36 obtains current zoom-position data (zoom-stage number), and reads a zoom factor corresponding to the obtained zoom-position data form the zoom table of ROM 37. Then, the camera control unit 36 selects the appropriate hand-shake compensation system corresponding to such zoom factor.

In other words, the camera control unit 36 judges at step S150 whether or not the zoom factor is lower than a reference factor that has been set previously. When it is determined at step S150 that the zoom factor is lower than the pre-set reference factor (YES at step S150), the camera control unit 36 sends a compensation instruction to the optical shake-compensation unit 25. Receiving the compensation instruction from the camera control unit 36, the optical shake-compensation unit 25 starts up and calculates a first compensation amount in accordance with a detection signal detected by the angle-rate sensor 24. Then, the optical shake-compensation unit 25 sends the calculated compensation amount to the optical compensation system driving unit 26. The optical compensation system driving unit 26 drives the optical compensation system 21 in accordance with the first compensation amount sent from the optical shake-compensation unit 25 at step S160. Then, the process returns to the process at step S115.

As a result, the optical compensation system 21 is driven in a direction perpendicular to the optical axis of the image pick-up lens (lenses) 2 by the optical compensation system driving unit 26. When driven, the optical compensation system 21 shifts an object image projected onto the imaging area of the imaging element 22.

Meanwhile, when it is determined at step S150 that the zoom factor is not lower than the reference factor that has been set previously (NO at step S150), the camera control unit 36 sends the compensation instruction to the base-plate shake compensation unit 27. Receiving the compensation instruction from the camera control unit 36, the base-plate shake compensation unit 27 starts up and calculates a first compensation amount in accordance with the detection signal detected by the angle-rate sensor 24. The base-plate shake compensation unit 27 sends the calculated compensation amount to the base-plate driving unit 28. The base-plate driving unit 28 drives the base plate 23 in accordance with the first compensation amount sent from the base-plate shake compensation unit 27 at step S170. Then, the process returns to the process at step S115.

As a result, the base plate 23 is driven in a direction perpendicular to the optical axis of the image pick-up lens (lenses) 2 by the base-plate driving unit 28. When driven, the base plate 23 shifts the imaging area of the imaging element 22.

In other words, in the case where the mode M1 has been set, compensation for object image shake by moving the optical compensation system 21 and compensation for object image shake by moving the imaging element 22 are performed separately depending on the pre-set zoom factor.

More specifically, when the zoon factor has been set low, the imaging element 22 is fixed and only the optical compensation system 21 is driven to compensate for the object image shake. In this case, power consumption is saved. On the contrary, when the zoon factor has been set high, the optical compensation system 21 is fixed and only the imaging element 22 is driven to compensate for the object image shake. In this case, optical aberration is suppressed to a low level.

When it is determined at step S120 that the mode M1 has not been set by the mode dial 3 shown in FIG. 1B (NO at step S120), the camera control unit 36 judges at step S130 whether or not the mode M2 has been set.

When it is determined at step S130 that the mode M2 has been set (YES at step S130), the camera control unit 36 sends the compensation instruction to the optical shake-compensation unit 25 and also to the base-plate shake compensation unit 27. Receiving the compensation instruction from the camera control unit 36, the optical shake-compensation unit 25 starts up and calculates a second compensation amount in accordance with the detection signal detected by the angle-rate sensor 24. Then, the optical shake-compensation unit 25 sends the calculated compensation amount to the optical compensation system driving unit 26. Similarly, receiving the compensation instruction from the camera control unit 36, the base-plate shake compensation unit 27 starts up and calculates a second compensation amount in accordance with the detection signal detected by the angle-rate sensor 24. The base-plate shake compensation unit 27 sends the calculated compensation amount to the base-plate driving unit 28. Then, the optical compensation system driving unit 26 drives the optical compensation system 21 in accordance with the second compensation amount sent from the optical shake-compensation unit 25 at step S180, and the base-plate driving unit 28 drives the base plate 23 in accordance with the second compensation amount sent from the base-plate shake compensation unit 27 at step S190. Then, the process returns to the process at step S115.

In short, in the case where the mode M2 has been set, both compensation for object image shake by moving the optical compensation system 21 and compensation for object image shake by moving the imaging element 22 are performed simultaneously. Therefore, for substantial object image shake on the imaging area of the imaging element 22, an appropriate compensation can be made.

Figure 7:
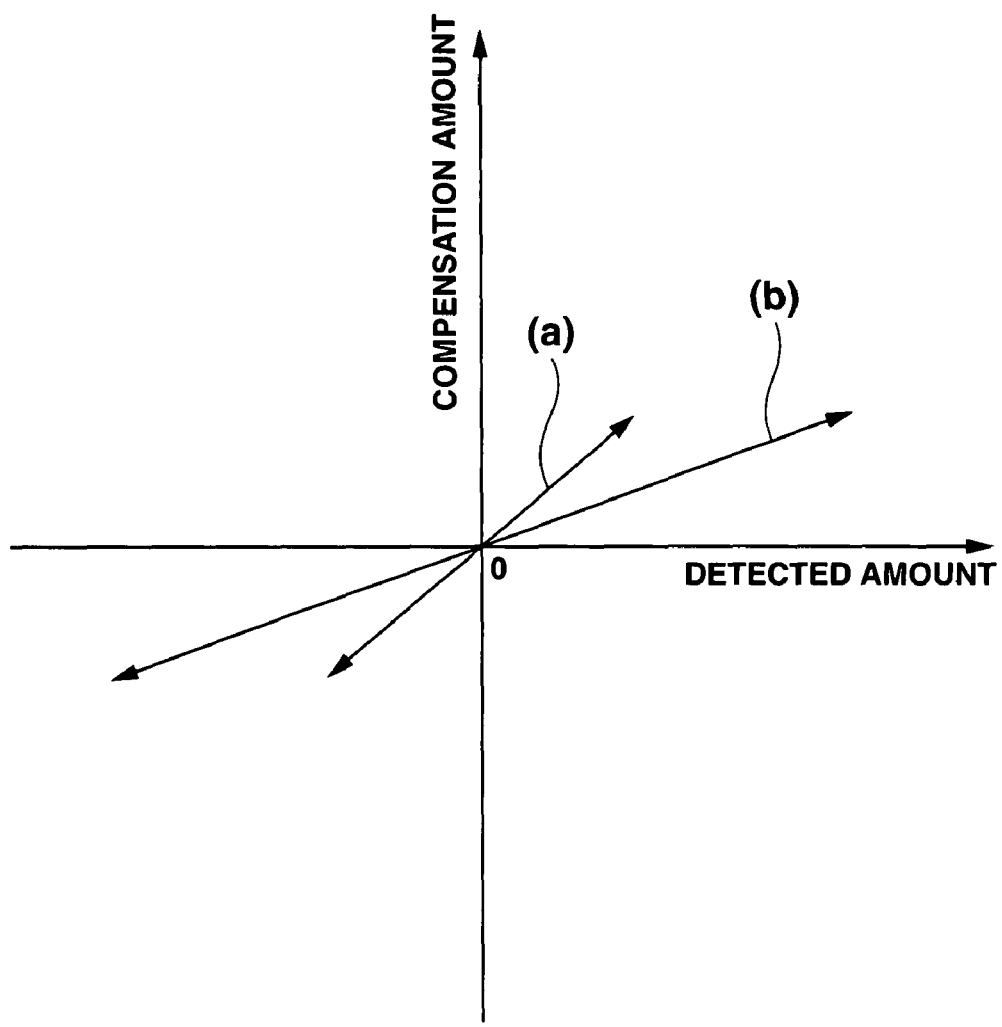
FIG. 7 is a view showing a relationship between compensation amounts and detection amounts in an optical instability-compensation unit and a base-plate instability compensation unit of the electronic camera according to the first embodiment of the invention.

As described above, in the mode M2, the compensation for object image shake by moving the optical compensation system 21 and compensation for object image shake by moving the imaging element 22 are performed simultaneously. Therefore, the second compensation amount in the mode M2 is previously set, for example, to half the first compensation amount in the mode M1. The first compensation amount in the mode M1 is calculated based on a first compensation amount (a) shown in FIG. 7. Also, the second compensation amount in the mode M2 is calculated based on a second compensation amount (b) shown in FIG. 7. The camera control unit 36 selects and sets the first compensation amount or alternatively the second compensation amount depending on the pre-set mode that is, depending on the mode M1 or M2.

The second compensation amount has not to be always set to half the first compensation amount. When both the compensation for object image shake by moving the optical compensation system 21 and compensation for object image shake by moving the imaging element 22 are performed simultaneously, it will be enough to set the amount of compensation by moving the optical compensation system 21 and amount of compensation by moving the imaging element 22 to such extent that the object image shake is not excessively compensated for.

In the case where compensation for object image shake is performed preferentially by moving the optical compensation system 21, such arrangement will appropriately compensate for object image shake with reduced power consumption that, only when object image shake exceeds a critical level, compensation by moving the imaging element 22 will be made in addition to compensation by moving the optical compensation system 21.

Further, modification may be made in the mode M2 such that the compensation for object image shake by moving the optical compensation system 21 and compensation for object image shake by moving the imaging element 22 are suspended until the shutter key 8 is operated, and the compensation for object image shake by moving the optical compensation system 21 and compensation for object image shake by moving the imaging element 22 are performed simultaneously, when the shutter key 8 has been operated, that is, when instructions of obtaining an image signal has been issued. The modification avoids excessive power consumption, and compensates for object image shake to the maximum level, only when compensation for object image shake is really needed.

When it is determined at step S130 that the mode M2 has not been set by the mode dial 3 (FIG. 1B) (NO at step S130), the camera control unit 36 judges at step S140 whether the mode M3 has been set or not.

When it is determined at step S140 that the mode M3 has been set (YES at step S140), the camera control unit 36 judges based on a signal sent from the operation unit 35 at step S200 whether the shutter key 8 has been pressed halfway or not. Meanwhile, it is determined at step S140 that the mode M3 has not been set (NO at step S140), the camera control unit 36 returns to the process at step S115.

When it is determined at step S200 that the shutter key 8 has been pressed halfway (YES at step S200), the camera control unit 36 sends the optical shake-compensation unit 25 instructions of compensation. Receiving the instructions of compensation from the camera control unit 36, the optical shake-compensation unit 25 starts up and calculates a first compensation amount in accordance with the detection signal detected by the angle-rate sensor 24. The optical shake-compensation unit 25 sends the calculated compensation amount to the optical compensation system driving unit 26. Then, the optical compensation system driving unit 26 drives the optical compensation system 21 based on the first compensation amount supplied from the optical shake-compensation unit 25 at step S210. Meanwhile, when it is determined at step S200 that the shutter key 8 has not been pressed halfway (NO at step S200), the camera control unit 36 returns to the process at step S115.

The camera control unit 36 judges based on the signal sent form the operation unit 35 at step S220 whether or not the shutter key 8 has been pressed completely. When it is determined at step S220 that shutter key 8 has been pressed completely (YES at step S220), the camera control unit 36 controls the optical shake-compensation unit 25 to calculate a second compensation amount based on the detection signal detected by the angle-rate sensor 24 and to send the calculated compensation amount to the optical compensation system driving unit 26, and then the camera control unit 36 sends the base-plate shake compensation unit 27 instructions of compensation. Receiving the instructions of compensation from the camera control unit 36, the base-plate shake compensation unit 27 starts up and calculates a second compensation amount in accordance with the detection signal detected by the angle-rate sensor 24. The base-plate shake compensation unit 27 sends the calculated compensation amount to the base-plate driving unit 28 at step S230. Then, the base-plate driving unit 28 drives the base plate 23 (and the imaging element 22) based on the second compensation amount sent from the base-plate shake compensation unit 27. At the same time, the optical compensation system driving unit 26 drives the optical compensation system 21 based on the second compensation amount supplied from the optical shake-compensation unit 25. Then, the camera control unit 36 returns to the process at step S115.

When it is determined at step S220 that the shutter key 8 has not been pressed completely (NO at step S220), the camera control unit 36 judges based on the signal sent from the operation unit 35 at step S240, whether the shutter key 8 has been released from halfway pressing operation or not. When it is determined at step S240 that the shutter key 8 has been released from halfway pressing operation (YES at step S240), the camera control unit 36 makes the optical shake-compensation unit 25 cease the driving operation of the optical compensation system driving unit 26 at step S250. Then, the camera control unit 36 returns to the process at step S115. While the shutter key 8 is kept pressed halfway (NO at step S220, NO at step S240), judgment is made repeatedly at step S220 and S240.

In short, when the mode M3 has been set, the compensation for object image shake by moving the optical compensation system 21 is performed with the shutter key pressed halfway or in a standby state. Further, when the shutter key 8 is pressed completely, or when a picture is taken, both the compensation for object image shake by moving the optical compensation system 21 and compensation for object image shake by moving the imaging element 22 are performed simultaneously. In this way, unnecessary power is not consumed in the standby state, and appropriate compensation for object image shake is made, when the object image is shaken considerably during shooting the object.

Now, the compensation for object image shake in respective modes will be described together with reference to a table shown in FIG. 5. In the case where the mode M1 has been set, the optical compensation system 21 is driven when the zoom factor is lower than the predetermined reference factor, and the base plate 23 on which the imaging element 22 is mounted is driven, when the zoom factor is higher than the predetermined reference factor. In other words, when the zoom factor is high, the optical compensation system 21 is fixed and only the imaging element 22 is moved to compensate for object image shake. In this case, an appropriate compensation for object image shake is performed with power consumption decreased, whereby deterioration in quality of a neighboring image can be avoided. When the zoom factor is low, the imaging element 22 is fixed and only the optical compensation system 21 is moved to compensate for object image shake, whereby power consumption is decreased.

In the case where the mode M2 has been set, irrespective of the zoom factor, both the optical compensation system 21 and the base plate 23 with the imaging element 22 mounted thereon are driven simultaneously, thereby compensating for object image shake. As a result, appropriate compensation can be made for larger object image shake.

In the case where the mode M3 has been set, when the shutter key 8 has been pressed halfway, the imaging element 22 is fixed, and only the optical compensation system 21 is moved to compensate object image shake. In this case, appropriate compensation can be made for object image shake with power consumption decreased as possible without deteriorating image quality.

Further, in the case where the mode M3 has been set, when the shutter key 8 has been pressed completely, irrespective of the zoom factor, both the optical compensation system 21 and the base plate 23 with the imaging element 22 mounted thereon are driven simultaneously, whereby appropriate compensation is made for object image shake. As a result, appropriate compensation can be made for larger object image shake.

In the case where the mode M2 or M3 has been set as described above, modification may be made to the embodiment described above. That is, when the compensation for object image shake by moving the optical compensation system 21 and compensation for object image shake by moving the imaging element 22 are performed simultaneously, a preset zoom factor is detected. When the detected zoom factor is lower than a predetermined second reference factor, the optical compensation system 21 is moved to compensate for object image shake, and when the detected zoom factor is higher than the predetermined second reference factor, the imaging element 22 is preferentially moved to compensate for object image shake. More specifically, when the detected zoom factor is lower than the predetermined second reference factor, the compensation for object image shake by moving the optical compensation system 21 is performed preferentially, and when a level of the movement-detection signal sent from the angle-rate sensor 24 exceeds a first critical amount, the compensation for object image shake by moving the imaging element 22 and compensation for object image shake by moving the optical compensation system 21 are performed simultaneously. The first critical amount is such an amount that when the level of the movement-detection signal sent from the angle-rate sensor 24 exceeds the amount, object image shake cannot be compensated for only by moving the optical compensation system 21. When the detected zoom factor is higher than the predetermined second reference factor, the compensation for object image shake by moving the imaging element 22 is performed preferentially. When the level of the movement-detection signal sent from the angle-rate sensor 24 exceeds a second critical amount, the compensation for object image shake by moving the optical compensation system 21 and compensation for object image shake by moving the imaging element 22 are performed simultaneously. The second critical amount is such an amount that when the level of the movement-detection signal sent from the angle-rate sensor 24 exceeds the amount, object image shake cannot be compensated for only by moving the imaging element 22. In the above arrangement, when the zoom factor is low, object image shake can be compensated for with power consumption decreased as possible and when the zoom factor is high, object image shake can be compensated for with optical aberration suppressed.

Second Embodiment

Now, configuration of an electronic camera according the second embodiment of the present invention will be described.

The electronic camera according the second embodiment has a modified configuration of the electronic camera according the first embodiment. The difference between these configurations is that the electronic camera of the second embodiment has an electronic hand-shake compensation processing unit (not shown) and an electronic instability-compensation processing unit (not shown). Further, the electronic camera of the second embodiment has no sensor corresponding to the angle-rate sensor 24 shown in FIG. 2.

The electronic hand-shake compensation processing unit is provided between the signal processing unit 30 and the image processing unit 31 (FIG. 2), and displaces a position from which image data is read in a direction perpendicular to the optical axis of the image pick-up lens 2 so as to cancel hand shake, thereby shifting image data to be obtained.

The electronic hand-shake compensation processing unit will be described in detail. The electronic hand-shake compensation processing unit comprises an area dividing unit, motion vector calculating unit, instability-compensation judging unit, and data processing unit.

Plural frames of image data, subjected to a signal process by the signal processing unit 30, are successively supplied to the electronic hand-shake compensation processing unit. The supplied image data are supplied to the area dividing unit and data processing unit.

The area dividing unit selects the central area of the received one frame of image data except the area surrounding the image to be subjected to an instability-compensation process, and divides the selected central area into nine areas. Nine pieces of image data corresponding respectively to divided areas (images) are supplied to the motion vector calculating unit.

Receiving nine divided images, the motion vector calculating unit compares them with nine divided images of the previous frame of image data, respectively, and executes a well known vector calculating process to calculate nine motion vectors. Further, the motion vector calculating unit executes an averaging process on the sizes and orientations of the nine motion vectors to calculate the representative vector representing the nine divided images.

The instability-compensation judging unit compares sizes and orientations of the nine motion vectors calculated by the motion vector calculating unit to judge whether or not the sizes and orientations of the motion vectors coincide with each other. When differences between the sizes of the motion vectors and differences between the orientations of the motion vectors fall within a predetermined range, the instability-compensation judging unit determines that image displacement between frames is caused due to "hand shake". When either difference between the sizes of the motion vectors or difference between the orientations of the motion vectors does not fall within the predetermined range, the instability-compensation judging unit determines that image displacement between frames is caused due to a "moving object". The instability-compensation judging unit outputs a switching signal to a switching unit (not shown), which determines depending on the above determination whether the compensation for object image shake due to hand shake is performed or not.

The data processing unit, which has a memory unit for storing image data supplied thereto, determines an area to be clipped from one frame image supplied from the signal processing unit 30, depending on the size and orientation of the representative vector calculated by the motion vector calculating unit. The data processing unit determines an area (clipping area) which is shifted from the clipped area of the previous frame image by a distance corresponding to the size and orientation of the representative vector. Further, the data processing unit clips an image corresponding to the clipping area from one frame image which is supplied from the signal processing unit 30 and stored in the memory unit of the data processing unit, and executes an electronic zooming process to enlarge the clipped image to the size of one frame image. The electronic zooming process executes an interpolation process on pixel data of the clipped image in a well known manner.

The electronic instability-compensation processing unit calculates a compensation amount for the optical compensation system 21 (shown in FIG. 2), depending on the sizes and orientations of the motion vectors calculated by the motion vector calculating unit provided in the electronic hand-shake compensation processing unit, and moves the optical compensation system 21 by the calculated compensation amount in a direction perpendicular to the optical axis of the image pick-up lens 2.

Therefore, when the compensation for hand shake is set ON in the standby state, the optical compensation system 21 is instantly moved to compensate for hand shake, and at the moment when the shutter key is pressed, the electronic hand-shake compensation processing unit is moved to cover an adequate shake compensation amount, whereby an appropriate compensation for object image shake is performed.

Modified Embodiment 1

Modified embodiment of the first embodiment of the electronic camera of the present invention will be described with reference to the block diagram of the electronic camera shown in FIG. 2.

Figure 6A:
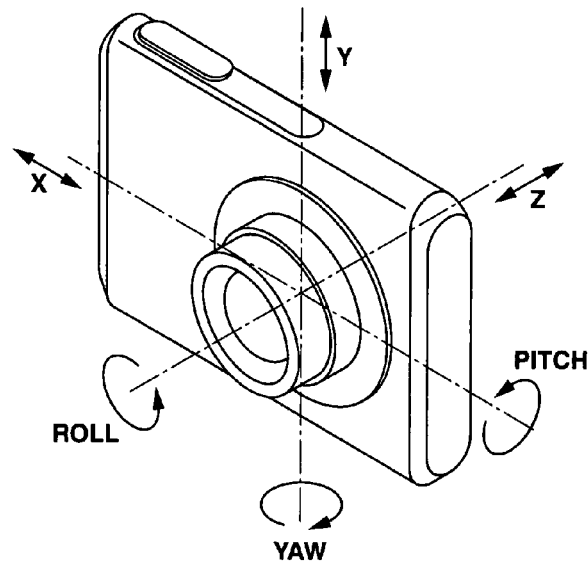
FIG. 6A is a view illustrating rotations about X-axis, Y-axis and Z-axis of an electronic camera provided with a gyro sensor.

In the block diagram of the electronic camera shown in FIG. 2, a gyro sensor is used in place of the angle-rate sensor 24. A vibrating gyro sensor of a sound bar type, vibrating gyro sensor, and a piezoelectric gyro sensor are preferable to be used as such gyro sensor. The gyro sensor detects rotation of a camera body (pitch) about X-axis, rotation of the camera body (yaw) about Y-axis, and rotation of the camera body (roll) about Z-axis, as illustrated in FIG. 6A.

Figure 6B:
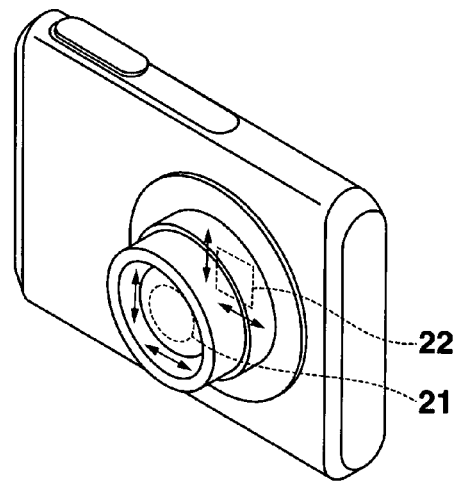
FIG. 6B is a view illustrating directions in which hand shake is compensated for by a optical shake-compensation system and an imaging element.

FIG. 6B is a view showing directions in which object image shake is compensated for by the optical compensation system 21 and the imaging element 22 in accordance with angle rates of rotation of the camera body (pitch rotation) about X-axis and rotation of the camera body (yaw rotation) about Y-axis.

Figure 6C:
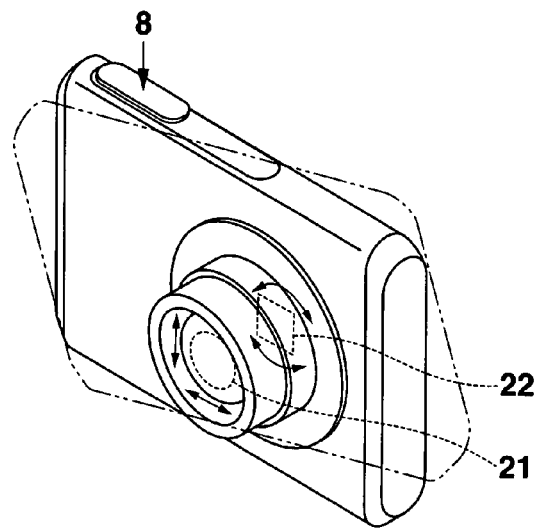
FIG. 6C is a view illustrating rotation of the electronic camera about Y-axis when a shutter key is pressed.

FIG. 6C is a view showing the electronic camera which rotates about Z-axis when the shutter key is pressed. Rotation of the camera body (roll) about Z-axis is detected by the angle-rate sensor 24. Object image shake about Z-axis is compensated for in accordance with the detected angle rate.

What is claimed is:

1. An imaging apparatus comprising:
    an image pickup lens;
    an imaging element having an imaging area for picking up an object image focused on the imaging area through the image pickup lens to output an image signal;
    a display monitor for displaying an image based on the image signal output from the imaging element;
    a zoom factor setting unit for setting a zoom factor of the image pickup lens;
    an instructing unit for giving an image-capturing instruction to obtain an image signal output from the imaging element;
    a shake detecting unit for detecting a shake amount of the imaging apparatus;
    a first shake compensation unit for moving the image pickup lens based on the shake amount detected by the shake detecting unit to compensate for a shake of the object image focused on the imaging area of the imaging element;
    a second shake compensation unit for moving the imaging element based on the shake amount detected by the shake detecting unit to compensate for a shake of the object image focused on the imaging area of the imaging element; and
    a control unit for (i) selectively controlling the first shake compensation unit or the second shake compensation unit, in accordance with the zoom factor of the image pickup lens set by the zoom factor setting unit, to operate to compensate for a shake of the object image, and (ii)

controlling both the first shake compensation unit and the second shake compensation unit to operate to compensate for a shake of the object image regardless of the zoom factor set by the zoom factor setting unit, when the image-capturing instruction has been given by the instructing unit.

2. The imaging apparatus according to claim 1, wherein the control unit controls the first shake compensation unit to operate to compensate for a shake of the object image, when the zoom factor set by the zoom factor setting unit is lower than a predetermined factor, and controls the second shake compensation unit to operate to compensate for a shake of the object image, when the zoom factor set by the zoom factor setting unit is not lower than the predetermined factor.

3. The imaging apparatus according to claim 1, wherein the control unit controls the first shake compensation unit and the second shake compensation unit to operate to compensate for a shake of the object image, when either one of the first shake compensation unit and the second shake compensation unit cannot compensate alone for a shake of the object image.

4. A method of compensating for a shake of an imaging apparatus, wherein the imaging apparatus comprises an image pickup lens, an imaging element including an imaging area for picking up an object image focused on the imaging area through the image pickup lens to output an image signal, a display monitor for displaying an image based on the image signal output from the imaging element, a zoom factor setting unit for setting a zoom factor of the image pickup lens, an instructing unit for giving an image-capturing instruction to obtain an image signal output from the imaging element, a shake detecting unit for detecting a shake amount of the imaging apparatus, a first shake compensation unit for moving the image pickup lens based on the detected shake amount to compensate for a shake of the object image focused on the imaging area of the imaging element, and a second shake compensation unit for moving the imaging element based on the detected shake amount to compensate for a shake of the object image focused on the imaging area of the imaging element, the method comprising:

selectively controlling the first shake compensation unit or the second shake compensation element, in accordance with the zoom factor set by the zoom factor setting unit, to operate to compensate for a shake of the object image; and when the image-capturing instruction has been given by the instructing unit, controlling both the first shake compensation unit and the second shake compensation unit to operate to compensate for a shake of the object image regardless of the zoom factor set by the zoom factor setting unit.

5. A computer readable medium having stored thereon a program that is executable by a computer of an imaging apparatus, wherein the imaging apparatus comprises an image pickup lens, an imaging element including an imaging area for picking up an object image focused on the imaging area through the image pickup lens to output an image signal, a display monitor for displaying an image based on the image signal output from the imaging element, a zoom factor setting unit for setting a zoom factor of the image pickup lens, an instructing unit for giving an image-capturing instruction to obtain an image signal output from the imaging element, a shake detecting unit for detecting a shake amount of the imaging apparatus, a first shake compensation unit for moving the image pickup lens based on the detected shake amount to compensate for a shake of the object image focused on the imaging area of the imaging element, and a second shake compensation unit for moving the imaging element based on the detected shake amount to compensate for a shake of the object image focused on the imaging area of the imaging element, the program being executable by the computer to cause the computer to perform functions comprising:

selectively controlling the first shake compensation unit or the second shake compensation unit, in accordance with the zoom factor set by the zoom factor setting unit, to operate to compensate for a shake of the object image; and when the image-capturing instruction has been given by the instructing unit, controlling both the first shake compensation unit and the second shake compensation unit to operate to compensate for a shake of the object image regardless of the zoom factor set by the zoom factor setting unit.

* * * * *